United States Patent [19]

Baker

[11] 4,027,473
[45] June 7, 1977

[54] FUEL DISTRIBUTION VALVE

[75] Inventor: Joseph R. Baker, Vernon, Conn.

[73] Assignee: United Technologies Corporation, Hartford, Conn.

[22] Filed: Mar. 5, 1976

[21] Appl. No.: 664,130

[52] U.S. Cl. .................... 60/39.28 R; 60/241; 60/243; 137/101; 137/608

[51] Int. Cl.² .................................. F02C 9/08

[58] Field of Search .......... 60/39.28 R, 241, 243; 137/101, 627, 628, 629, 630, 608

[56] References Cited

UNITED STATES PATENTS

| | | | |
|---|---|---|---|
| 2,724,239 | 11/1955 | Fox | 60/39.28 R |
| 2,927,425 | 3/1960 | Werts | 60/39.28 R |
| 2,963,082 | 12/1960 | Binford | 60/39.28 R |
| 3,067,576 | 12/1962 | Campbell | 60/39.28 R |
| 3,106,934 | 10/1963 | Rogers | 60/39.28 R |
| 3,141,298 | 7/1964 | Simpson | 60/241 |
| 3,750,396 | 8/1973 | Tucker | 60/39.28 R |
| 3,874,170 | 4/1975 | Lewis | 60/241 |

Primary Examiner—Clarence R. Gordon
Attorney, Agent, or Firm—Norman Friedland

[57] ABSTRACT

This invention relates to a fuel distribution valve for a turbine type power plane capable of supplying fuel to a set of primary nozzles and proportioning the flow to a set or sets of secondary nozzles upon initiation of a command signal which may be manifested by the fuel control.

10 Claims, 4 Drawing Figures

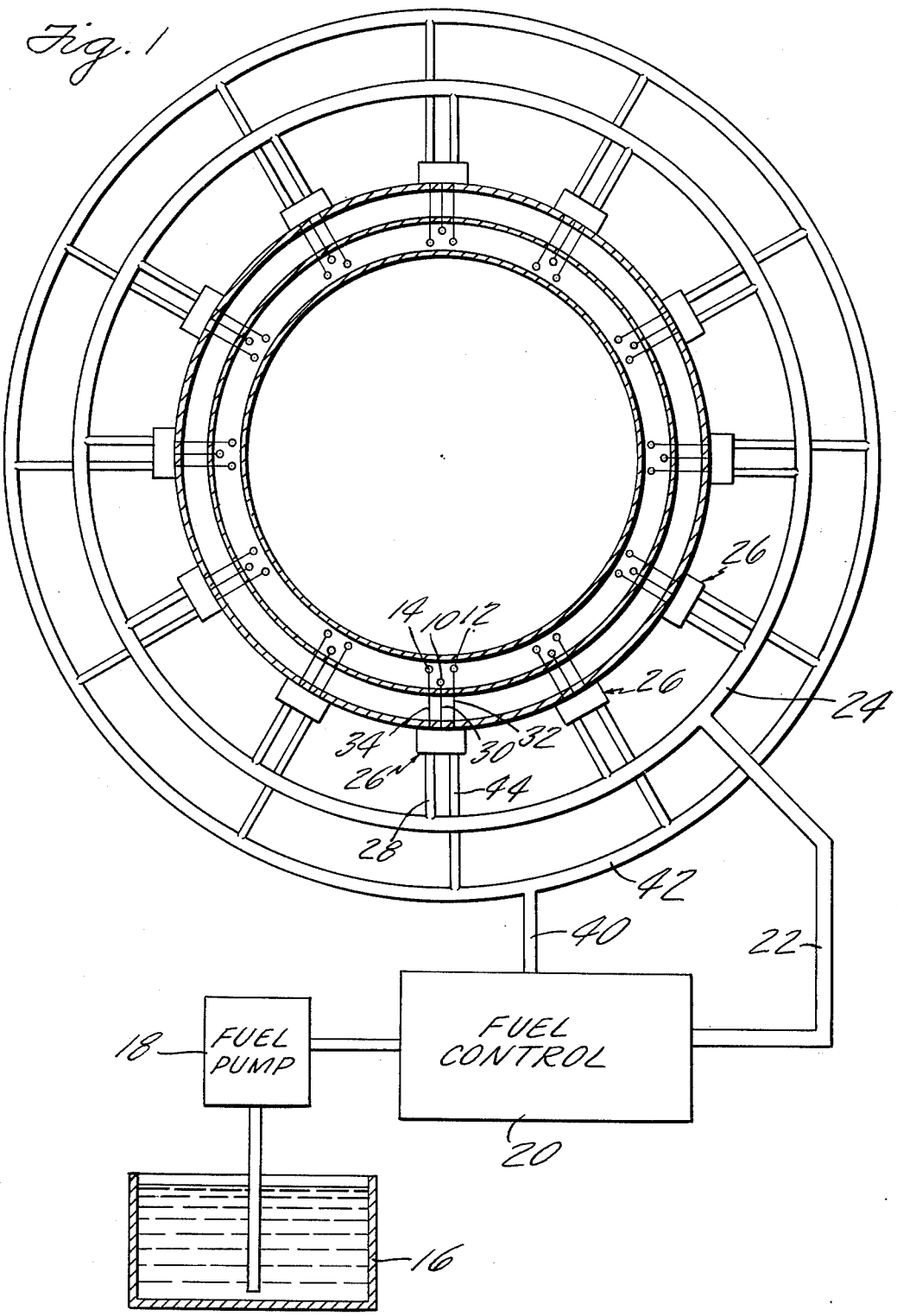

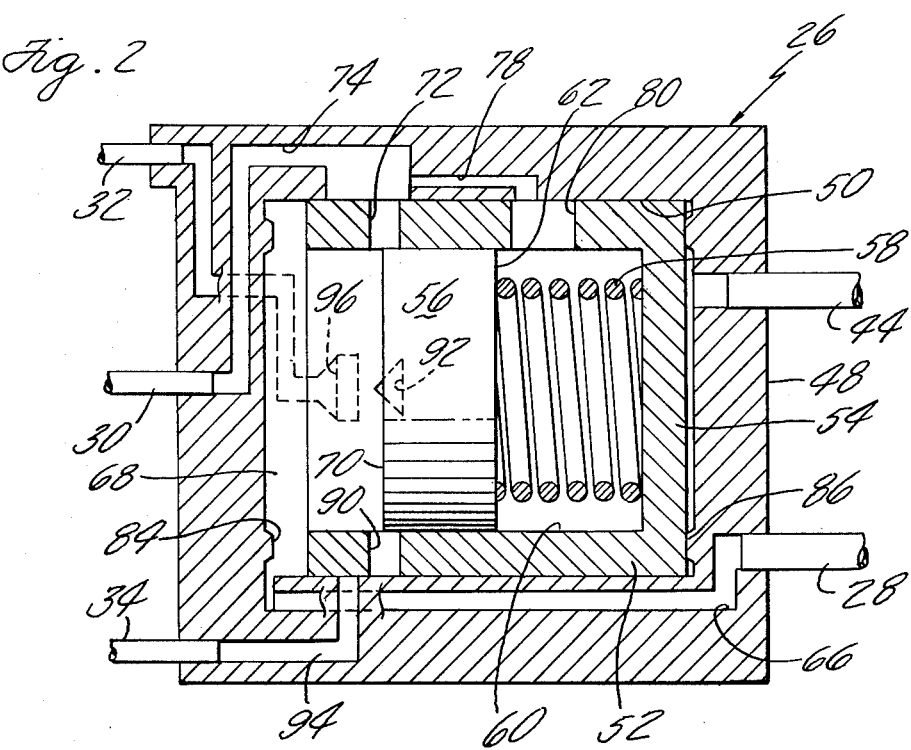
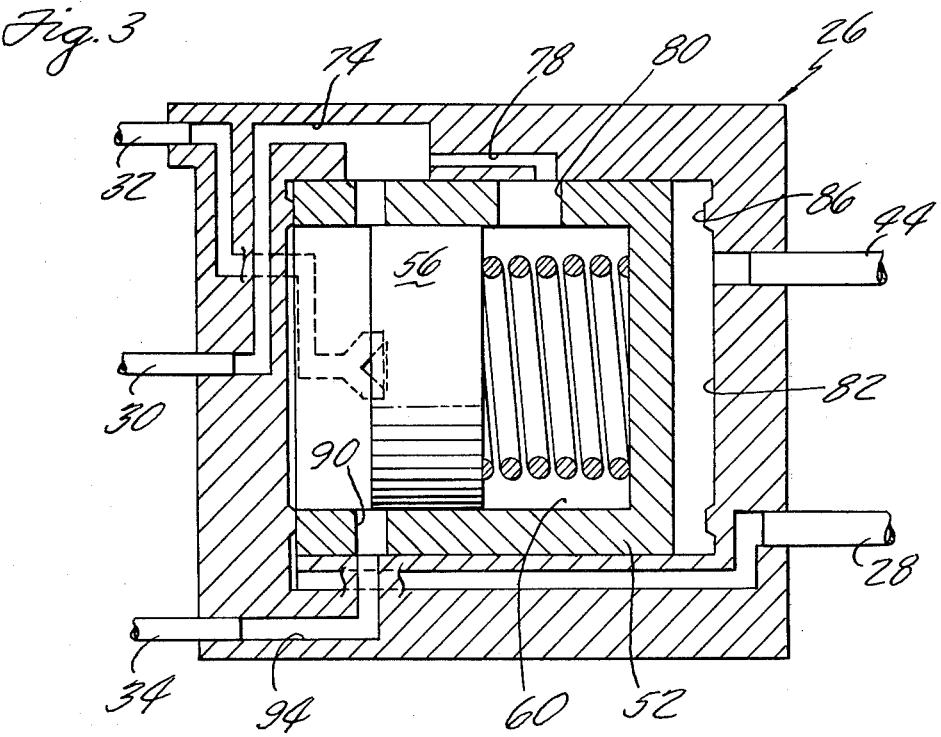

FUEL DISTRIBUTION VALVE

BACKGROUND OF THE INVENTION

This invention relates to a fuel supply system for a turbine type power plant and more particularly to a fuel distribution valve.

As is well known it is necessary in certain combustors of turbine types of power plants to divide the fuel flow metered by the fuel control to different sets of nozzles. In certain burner configurations two or more sets of nozzles are provided, namely the primary nozzle which is continuously on and the secondary or sets of secondary nozzles which are actuated only after a certain engine or aircraft flight condition is reached. For example, at engine start to idle the primary nozzle will receive 100% of the fuel flow from the fuel control. At take-off, climb, cruise and landing, the secondary nozzles are turned on. While the total flow of fuel to the engine will be increased beyond the amount called for at and below idle, the distributor valve, to work effectively, should distribute the flow of fuel to the different sets of nozzles at a given proportion.

While distributing valves are not new in this field of technology, the heretofore known types are relatively complex and expensive to manufacture. This invention contemplates a simple, yet reliable, fuel distributor valve requiring a minimum number of movable parts, while assuring that the flow at the different sets of nozzles are proportioned according to a predetermined schedule.

SUMMARY OF THE INVENTION

A primary object of this invention is to provide for a turbine type power plant an improved fuel distributor valve. Another object of this invention is to proportion the flow of fuel to different fuel nozzles and/or sets thereof as a function of $P_f - P_b$, where $P_f$ = fuel pressure and $P_b$ = burner pressure.

Another object of this invention is to provide a fuel flow distributor valve that is characterized by its minimum moving parts, being relatively simple and inexpensive to manufacture.

A still further object of this invention is to provide a fuel distributor valve that split the fuel to different sets of fuel nozzles as a function of an engine operating parameter manifested by the fuel control which may be compressor speed.

Other features and advantages will be apparent from the specification and claims and from the accompanying drawings which illustrate an embodiment of the invention.

BRIEF DESCRIPTION OF THE DRAWINGS

FIG. 1 is a schematic illustration of a fuel system for a turbine type power plant.

FIG. 2 is a sectional view illustrating the details of the invention when the total amount of fuel is delivered to the primary nozzle.

FIG. 3 is the same as FIG. 4 only showing the flow being split where a portion is delivered to the secondary nozzle.

DESCRIPTION OF THE PREFERRED EMBODIMENT

Figure 4:
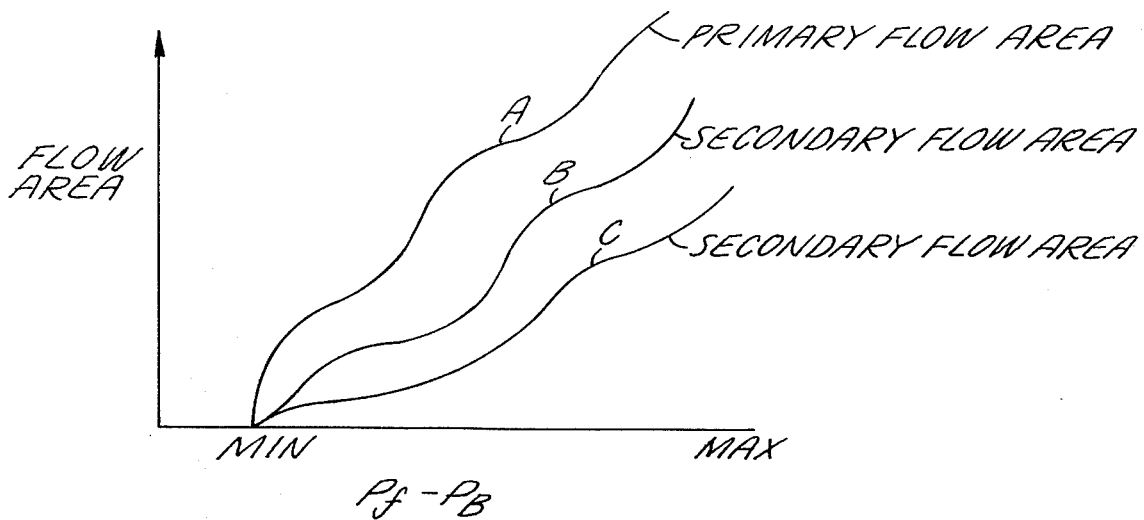
FIG. 4 is a graph plotting flow area of the primary and secondary nozzles as a function of the control parameter $(P_f - P_b)$.

FIG. 1 shows schematically a typical fuel distribution system for the main combustor of a turbine type power plant where the combustor includes a set of primary fuel nozzles 10, a set of secondary nozzles 12 and another set of secondary nozzles 14, each set being judiciously spaced around the circumference. In this instance, the combustor is shown as an annular type, but other types may be employed without departing from the scope of this invention. Fuel from the fuel tank 16 is pressurized by pump and in turn is metered by fuel control 20. Each of these units are well known in the art and a detailed description is omitted herefrom for the sake of clarity and simplicity.

Suffice it to say that the fuel control, which may for example be of the type exemplified by the JFC-60 manufactured by the Hamilton Standard division of United Technologies Corporation, serves to meter the proper amount of fuel to the engine to obtain efficient engine operation, control acceleration and deceleration while avoiding surge, rich or lean blowout. As shown fuel from the fuel control is metered into conduit 22 where it is distributed to fuel manifold 24. Each of the distributor valves generally illustrated by reference numeral 26 communicate with fuel manifold 24 through trunk line 28 and serves to distribute fuel to nozzles 10, 12 and 14 via lines 30, 32 and 34 respectively as will be described hereinbelow. While a single distributor valve is shown for each set of primary and secondary fuel nozzles it is to be understood that a distributor valve can serve more than one and may serve several of these sets of nozzles. The number or ratio of nozzles to sets of nozzles per distributor valves will depend on the engine design and mission and particularly to the engine or combustion response time desired.

The control signal manifested by fuel control 20 which may, say be compressor speed, which in the model JFC-60 fuel control, supra, is reflected in the available speed servo pressure may be relayed to each distributor valve 26 via line 40, manifold 42 and trunk line 44.

The details of this invention can be seen by referring to FIGS. 2 and 3 showing the distributor valve 26 (only one being described as the others are all identical) having a housing 48 having a central bore 50 closed at either end. Cylindrical sleeve 52 closed at end 54 is slidably mounted in bore 50. Piston 56 is slidably mounted in sleeve 52 and is urged in one direction by spring 58 and pressure of fuel in chamber 60 acting on reaction face 62 of piston 56.

Fuel metered by fuel control 20 is continuously fed via line 28 and drilled passage 66 into chamber 68 to act against reaction surface 70 of piston 56. As can be seen piston 56, acts as a land and cooperates with port 72 formed in sleeve 52 to meter fuel to fuel nozzle 10 via drilled passage 74 which communicates with line 30.

It is apparent from the foregoing since fuel pressure upstream of port 72 acting on reaction face 70 and fuel pressure downstream of port 72 bled to chamber 60 via drilled passage 78 and port 80 formed in sleeve 52, acts on reaction face 62, the value of the quantity of fuel being metered will be a function of the rate of spring 58 and the pressure difference. Hence this pressure differential, i.e. upstream pressure $P_f$ (fuel pressure in chamber 68) and downstream $P_b$ (fuel pressure in chamber 60) continuously adjusts the area to provide the proper fuel flow. The fuel pressure ($P_b$) is approximately equal to the engine combustor pressure due to the low pressure drops in passages 78, 74, 30, and nozzle 10. In this mode of operation, all the fuel supplied by the fuel control will be delivered to fuel nozzle 10.

At a predetermined time when the aircraft condition calls for the engine to operate above idle, a signal manifested by the fuel control, will be sent to chamber 82 via line 44 acting behind close end 54 of sleeve 52. Sleeve 52 will move leftwardly against stop 84 when the command signal exceeds a predetermined pressure value. Obviously, sleeve 52 will remain against stop 86 below this predetermined value. In the new position of sleeve 52, ports 90 and 92 align with drilled passages 94 and 96 respectively, which in turn communicate with feed lines 34 and 32, respectively. The left end of piston 56, acting as a land and distributes fuel to all the three nozzles, (primary 10, and secondaries 12 and 14) with the same flow regulation as was described above.

It is apparent from the foregoing, when in the fuel splitting mode, i.e. when sleeve 52 is against stop 84, piston 56 will continuously modulate thereby, continuously and simultaneously modulating the flow area to the primary and secondary nozzles. As was the case when piston 56 modulated the flow area of ports 72 in FIG. 2, piston 56 will now modulate the flow area of not only port 72, but also ports 90 and 92. Hence the quantity of fuel split to each nozzle will be a function of $P_f - P_b$. As shown in FIG. 4, between the minimum and maximum values of $P_f - P_b$ the flow areas will be proportioned according to the schedule of curves A, B, and C, where curve A represents the area for the primary nozzle, curve B is the area to the secondary nozzle 12 and curve C is the area to the secondary nozzle 14. The slope and shape of individual curves can be selected by the dimension and shape selected for each of ports 72, 90 and 92. Thus, for every given point along the abscissa ($P_f - P_b$) the fuel splitting will take the proportions illustrated by the corresponding point picked off of curves A, B, and C.

Thus, it will be appreciated that distributor valve 26 virtually comprises two movable parts, piston 56 and sleeve 52, each cooperating to split the flow at a predetermined point of operation and proportion the flow at a predetermined schedule.

It should be understood that the invention is not limited to the particular embodiments shown and described herein, but that various changes and modifications may be made without departing from the spirit or scope of this novel concept as defined by the following claims.

I claim:

1. A distribution system for a primary and secondary fuel nozzle system for a combustor of a turbine type power plant comprising at least one distributor valve having a first movable means for exposing a fuel opening in said first movable means communicating with said primary nozzle in a first and second position thereof and another fuel opening in said first movable means communicating with said secondary nozzle solely in the said second position thereof, a second movable means movable relative to said first movable means for regulating flow of fuel through both of said fuel openings, and means responsive to the pressure drop across at least one of said openings for regulating the position of said second movable means, whereby the flow through each of said openings bears a given relationship to each other for each pressure drop value.

2. A distribution system as claimed in claim 1 wherein said first movable means is responsive to an engine operating condition.

3. A distribution system as claimed in claim 2 wherein said fuel distribution system includes a fuel control which meters the desired amount of fuel for power plant operation, connection means interconnecting said fuel control and said distributor valve for leading fuel to said primary and secondary nozzles as directed by said distributor valve, and means responsive to said fuel control for positioning said first movable means to said first and second position.

4. A distribution system as claimed in claim 1 wherein said first movable means include a sleeve closed at one end defining a chamber for continuously receiving fuel being in communication with both of said fuel openings formed in said sleeve.

5. A distributor valve as claimed in claim 4 wherein said closed end includes a reaction face, and means connecting said reaction face for supplying a pressure for positioning said sleeve to said second position.

6. A distributor valve as claimed in claim 5 wherein said second movable means is an axially movable piston in said sleeve having a first and second reaction face, said first reaction face exposed to the pressure of fuel in said chamber, and said second reaction face exposed to pressure substantially equal to the pressure in said combustor.

7. A fuel distributor valve for directing fuel to at least one primary nozzle and at least one secondary nozzle in a combustor of a turbine type power plant, comprising a housing having a central bore closed at each end, a sleeve having an open end in said bore movable to two positions, a piston in said sleeve dividing said sleeve into two compartments, one of said compartments continuously receiving fuel flow into said open end to be distributed to said combustor, said piston cooperating with a first port in said sleeve communicating with said primary nozzle, said sleeve having a second port rendered inoperative in said first position of said sleeve, said sleeve movable to a second position for directing fuel from said one of said compartments to said second port through an opening in said housing communicating with said secondary nozzle whereby said second port is rendered operative, and means for porting fuel from a point intermediate said first port and said primary nozzle to said other of said compartments for proportioning the fuel flow to said primary and secondary nozzles as a function of the pressure of fuel and the pressure of said combustor.

8. A fuel distributor valve as claimed in claim 7 including a spring in said other of said compartments bearing against said piston to urge it in a port closing position.

9. A fuel distributor valve as claimed in claim 8 wherein said end opposite said open end of said sleeve includes an end wall defining with said housing a chamber, signal receiving means for admitting a pressure in said chamber to bear against said end wall to urge said sleeve to its second position.

10. A fuel distributor valve as in claim 9 in which said ports are pre-sized and shaped to expose a predetermined area for each position of said piston so as to provide a predetermined amount of fuel flow to said primary and said secondary nozzles at each position over the stroke of said piston.

* * * * *